United States Patent [19]

Wills

[11] Patent Number: 5,059,117
[45] Date of Patent: Oct. 22, 1991

[54] RADIANT TUBE FURNACE AND METHOD OF BURNING A FUEL

[75] Inventor: Brian J. Wills, Kinver, United Kingdom

[73] Assignee: Stordy Combustion Engineering Limited, West Midlands, United Kingdom

[21] Appl. No.: 593,512

[22] Filed: Oct. 2, 1990

Related U.S. Application Data

[63] Continuation of Ser. No. 308,851, Feb. 9, 1989, abandoned.

[30] Foreign Application Priority Data

Feb. 11, 1988 [GB] United Kingdom ............... 8803183

[51] Int. Cl.⁵ .............................................. F27B 3/22
[52] U.S. Cl. .................................. 432/176; 432/180; 432/209; 126/91 A
[58] Field of Search ............... 432/175, 176, 147, 148, 432/180, 209; 126/91 A

[56] References Cited

U.S. PATENT DOCUMENTS

| | | | |
|---|---|---|---|
| Re. 28,679 | 1/1976 | Robinson | 431/9 |
| 1,857,447 | 5/1932 | Engels | 432/209 |
| 3,207,493 | 9/1965 | Swain | 432/180 |
| 3,529,812 | 9/1970 | Wunning | 432/176 |
| 4,306,858 | 12/1981 | Simon | 432/209 |
| 4,355,973 | 10/1982 | Bailey | 126/91 A |
| 4,421,474 | 12/1983 | Meyer | 431/115 |
| 4,730,599 | 3/1988 | Kendall et al. | 126/91 A |
| 4,828,483 | 5/1989 | Finke | 432/180 |
| 4,840,560 | 6/1989 | Waddington | 432/180 |
| 4,870,947 | 10/1989 | Kawamoto | 432/181 |

FOREIGN PATENT DOCUMENTS

| | | |
|---|---|---|
| 0141594 | 5/1985 | European Pat. Off. |
| 1090079 | 3/1955 | France . |
| 2403518 | 4/1979 | France . |
| WO86/07434 | 12/1986 | PCT Int'l Appl. |
| 1035247 | 7/1966 | United Kingdom . |
| 1168137 | 10/1969 | United Kingdom . |
| 1206569 | 9/1970 | United Kingdom . |
| 1538255 | 1/1976 | United Kingdom . |
| 2081433A | 2/1982 | United Kingdom . |

OTHER PUBLICATIONS

Douspis, M. Michel, "Une Utilisation Rationnelle de L'Energie: Le Tube Radiant A Gaz", *Gaz D'Aujourd-'Hui*, vol. 98, No. 9, Sep. 1974, pp. 395-400, Paris, France.

*Primary Examiner*—Henry C. Yuen
*Attorney, Agent, or Firm*—Fulwider, Patton, Lee & Utecht

[57] ABSTRACT

A radiant tube furnace has a pair of regenerative burners firing alternately into opposite ends of the tube. There is a respective inlet at each end of the tube for admitting gas to the tube immediately adjacent to the wall thereof and these inlets communicate via a duct so that products of combustion are drawn from one end of the tube and introduced into the opposite end of the tube, where the burner is firing.

5 Claims, 1 Drawing Sheet

RADIANT TUBE FURNACE AND METHOD OF BURNING A FUEL

This application is a continuation of application Ser. No. 07/308,851, filed Feb. 9, 1989, now abandoned.

SUMMARY OF THE INVENTION

The present invention relates to heating by means of a tube within which a fuel is burned to release heat. Heat is radiated from the tube and a furnace constructed to heat workpieces or materials in this way is referred to as a radiant tube furnace.

According to a first aspect of the present invention, there is provided a method of burning a fuel to supply heat wherein a burning mixture of the fuel with air is directed along the interior of a tube to heat the tube and cause the tube to radiate heat, a further gas is admitted to the interior of the tube adjacent to the wall thereof and wherein the further gas forms a shield between the burning mixture and a part of the tube wall.

It will be understood that the burning mixture of fuel with air will not necessarily be homogeneous. Typically, the fuel and the air will be maintained separate from each other until they are about to be directed into the tube. Some degree of mixing may occur upstream of the tube but mixing of the fuel with air will continue within the tube.

An end portion of a radiant tube is generally disposed within an opening formed in a wall of a furnace. It will be understood that this end portion of the tube cannot readily radiate heat, because it is closely surrounded by the furnace wall and the wall itself is formed of materials which do not conduct heat easily, so that the surface of the opening in the wall will quickly become heated to a temperature approximately equal to that of the end portion of the tube. To avoid heating of the end portion of the tube to a temperature at which deterioration of the tube is likely to occur, it is desirable to provide a shield of sleeve-like form between the end portion of the tube and the burning mixture inside the tube. This shield may be formed by the further gas admitted to the tube, or may a fixed shield formed of solid material or these two forms of shield may be used in combination. The invention is applicable with especial advantage in a case where the burning mixture of fuel and air is directed into the tube from a regenerative burner, since heating of the combustion air in a regenerative burner results in a relatively high flame temperature.

The further gas is preferably substantially devoid of free oxygen and is preferably non-combustible. The further gas may include products of combustion of the fuel in the tube, these products being circulated through the tube. It will be understood that a fraction only of the products of combustion would be circulated through the tube to provide the gaseous shield. A further fraction of the products of combustion may be exhausted from the tube through heat storage means which extracts heat from the products of combustion and subsequently imparts that heat to combustion air.

Whilst it would be within the scope of the invention to cool that fraction of the products of combustion which are to be circulated through the tube to provide the gaseous shield, it is believed that the temperature of the products of combustion leaving the tube will be sufficiently low for the products of combustion to provide an effective shield, without further cooling of the products of combustion prior to admission of those products to the tube. If required, the further gas may include a first portion of circulated products of combustion which have not been cooled significantly outside the tube and a further, relatively cool portion.

According to a second aspect of the invention, there is provided a radiant tube furnace having a pair of regenerative burners, one at each end of the tube, wherein there is associated with each burner a respective inlet of annular form for admitting to the tube adjacent to the wall thereof an annular, gaseous shield and wherein the burner is arranged to direct air and fuel into the tube along a path which is surrounded by the annular inlet.

The furnace preferably comprises a duct connecting the annular inlets to each other for flow of products of combustion from one end of the tube to the other end of the tube, via the annular inlets. The pressure and velocity conditions in the tube will generally be such that products of combustion will flow through the duct from that end of the tube where products of combustion are exhausted from the tube to that end of the tube where the associated burner is firing into the tube, without use of any pump or any other device to impart kinetic energy to the products of combustion within the duct. However, a pump or injector may be used to promote flow to the annular inlet adjacent to the burner which is firing. There may be associated with the duct a valve for controlling the flow of products of combustion along the duct.

There is also provided in accordance with the invention a radiant tube furnace having at at least one end of the tube a burner and an annular inlet for admitting to the tube adjacent to the wall thereof an annular, gaseous shield, the burner being arranged to direct air and fuel into the tube along a path which is surrounded by the annular inlet.

BRIEF DESCRIPTION OF THE DRAWING

An example of a furnace embodying the present invention and which is used for burning a fuel by a method in accordance with the invention will now be described, with reference to the accompanying drawing, which shows diagrammatically a cross-section through a furnace having two regenerative burners, internal parts of one only of these burners being shown.

DESCRIPTION OF PREFERRED EMBODIMENT

Figure 1:
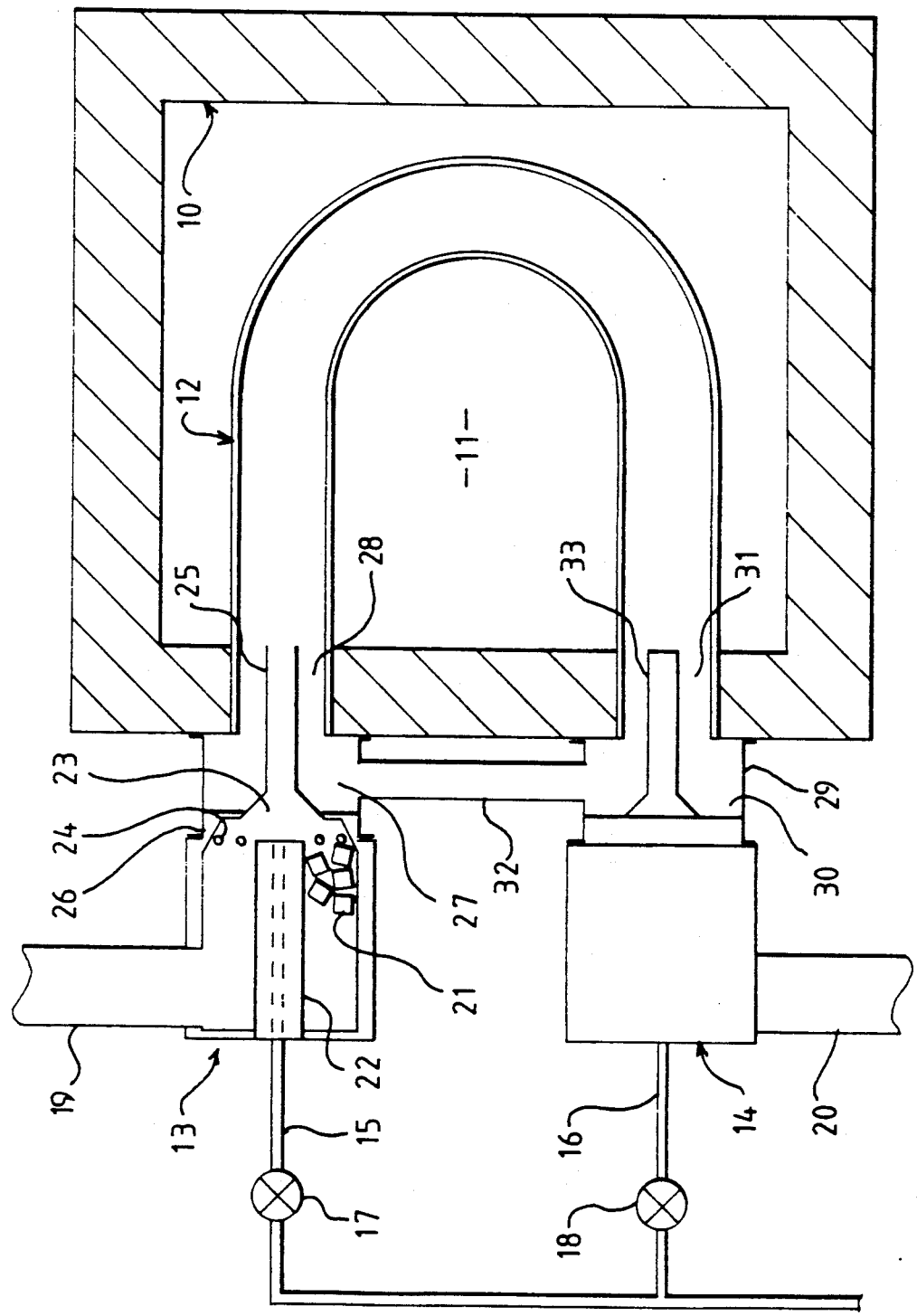

The furnace illustrated in the drawing has a wall 10 enclosing a chamber II in which material or workpieces is or are to be heated. A substantially U-shaped tube extends into the chamber II from the wall at one side of the chamber, with end portions of the tube being disposed in respective openings formed in the wall. The general arrangement and construction of the furnace, including the wall 10 and the tube 12, may be those of a known furnace and will not be further described.

Regenerative burners 13 and 14 are mounted at the outside of the furnace wall 10 in alignment with respective end portions of the tube 12. Fuel lines 15 and 16 are provided for supplying fuel to the burners from a suitable source, for example a natural gas main. Control means of the burners includes valves 17 and 18 for controlling the flow of fuel along the fuel lines. The burner 13 has an inlet duct 19 along which combustion air can flow to the burner and along which products of combustion can leave the burner and pass to the atmosphere through a suitable stack. The burner 14 has a corresponding inlet duct 20 for leading combustion air to the burner 14 and for conveying products of combustion from that burner to the stack. The control means includes valves for connecting the inlet ducts 19 and 20 in turn with the stack and with a fan or other means for supplying the combustion air.

The burners 13 and 14 are identical one with the other and therefore the arrangement of the burner 13 only will be described and is shown in the drawing. The burner contains an annular bed 21 of refractory elements which is in direct communication with the inlet duct 19. The inner periphery of the bed is defined by a tube 22, along the interior of which the fuel line 15 extends to or almost to a mixing position 23 which lies adjacent to that end of the tube 22 which is nearer to the radiant tube 12. The mixing position 23 is separated from one end of the bed 21 by retaining means 24 for preventing the refractory elements falling from the bed into the mixing position. The retaining means is of a form which provides little obstruction to the flow of air from the bed to the mixing position and which does not promote severe turbulence in air flowing from the bed to the mixing position. The retaining means may, for example, comprise a number of bars which are spaced from each other and from the tube 22 by relatively large gaps for the unobstructed flow of air.

The burner 13 further comprises a hollow guide 25 for guiding air from the bed 21 and fuel from the fuel line 15 into the tube 12. The guide includes a divergent end portion of conical form which surrounds the mixing position 23 and which is held in substantially fluid-tight relation with an annular body of the burner surrounding the bed 21. An opposite end portion of the guide is of cylindrical form, extends into the adjacent end portion of the tube 12 and extends at least along that end portion of the tube which is surrounded by the wall 10. The guide may protrude somewhat beyond the internal face of the wall 10. It will be noted that the guide 25 is arranged as a cantilever and is supported only at its conical end portion. Accordingly, the guide is formed of a robust material which can withstand particularly high temperatures, without deterioration. An example of a suitable material is silicon carbide.

There is interposed between the burner 13 and the furnace wall 10 a housing 26 inside which there is an annular inlet chamber 27 surrounding a part of the guide 25. Typically, the housing has an outwardly projecting flange at each of its ends, one of these flanges being secured by bolts to the wall 10 and the other flange being secured by bolts to a corresponding flange of the burner 13.

The outside diameter of that part of the guide 25 which lies within the end portion of the tube 12 is considerably less than is the internal diameter of the end portion of the tube. Accordingly, there is an annular space 28 between the guide and the tube. This space communicates directly with the chamber 27 and so provides direct communication between the inlet chamber and the interior of the radiant tube.

A housing 29 corresponding to the housing 26 is interposed between the burner 14 and the furnace wall 10. This housing defines an inlet chamber 30 which communicates with the interior of the radiant tube through an annular space 31 corresponding to the space 28. A duct 32 extends between the housings 26 and 29, providing direct communication between the inlet chambers 27 and 30. In the example shown in the drawing, this duct lies outside the furnace wall 10 but nearer to the furnace wall than are the burners 13 and 14. The housings 26 and 29 and the duct 32 may be insulated externally against heat loss.

When the burner 13 is firing, fuel and air are supplied to that burner. The fuel is directed through the mixing position 23 along the interior of the guide 25. The air passes through the bed 21, where it is heated, and then passes through the mixing position 23 and along the interior of the guide. Some degree of mixing of the fuel and air occurs at the mixing position so that a flame is established inside the guide 25. However, thorough mixing of the fuel and air is not achieved at the mixing position. Mixing continues as the gases flow along the guide 25 and may continue after the burning mixture has left the guide 25 and flows along the interior of the radiant tube 12. Typically, the flame extends at least to the bend in the tube. Products of combustion flow along the tube towards the burner 14. A first portion of the products of combustion flows along the interior of the guide 33 associated with the burner 14 and then through the bed of refractory elements contained in that burner, so heating the refractory elements, before this portion of the products of combustion is discharged to the atmosphere. A complementary portion of the products of combustion flows through the annular space 31 into the inlet chamber 30 and from there through the duct 32 to the inlet chamber 27. From this inlet chamber, the products of combustion flow into the tube 12 along the annular space 28. It will be noted that the products of combustion entering the tube along the space 28 are confined to a region of the tube which is immediately adjacent to the wall of the tube. The flow of products of combustion is distributed substantially evenly around the circumference of the tube.

The products of combustion entering the tube 12 through the annular space 28 form a shield between the burning mixture of fuel and air and the wall of the tube 12. This shield is maintained downstream of the guide 25, although turbulence of the gases within the tube 12 will disrupt the gaseous shield so that the shield is not maintained throughout the tube. Typically, the shield will cease to be effective at a position upstream of the bend in the radiant tube.

When one half cycle of operation of the burners has been completed, the supply of fuel and air to the burner 13 is terminated and firing of the burner 14 commences. This changes the pressure and velocity conditions within the radiant tube 12 in such a way that flow of products of combustion is induced in the opposite direction along the duct 32. Thus, products of combustion flow from the tube 12 into the chamber 27 and thence through the duct to the chamber 30. The products of combustion flow from the chamber 30 into the tube 12 to form a gaseous shield in a manner analogous to that hereinbefore described.

Those end portions of the tube 12 which are closely surrounded by the wall 10 are shielded from the burner flames by the guides 25 and 33 and also by the gaseous shields. Further portions of the wall of the tube 12 are shielded from the hotest parts of the flames by the gaseous shields. Even though the regenerative burners produce flames having very high temperatures, the wall of the tube 12 is not subjected to an excessively high temperature and the imparting of heat to the tube wall is distributed more evenly along the tube than would be the case in the absence of the gaseous shields.

The shape and size of the duct 32 and of the inlet chambers 27 and 30 can be selected to provide for the required flow rate of products of combustion through the duct. If required, a valve may be associated with the duct, in order that the resistance to flow of gases through the duct can be varied. Up to one half of the products of combustion may be circulated.

In a first modification of the arrangement illustrated in the accompanying drawing, the duct 32 is disposed in the furnace wall 10 or in the chamber II and provides direct communication between the annular space 28 and the annular space 31. In a further modification, a pair of ducts is substituted for the duct 32. One of these ducts connects the inlet duct 19 with the inlet chamber 30 and the other connects the inlet duct 20 with the inlet chamber 27. Valves may be provided for opening these ducts alternately so that products of combustion which have been cooled by one of the burners are returned to the radiant tube at the end thereof into which the other burner is firing.

Whilst the invention is conveniently applied to a furnace having a radiant tube which is generally U-shaped, it will be understood that the invention may also be applied to a furnace having a rectilinear radiant tube. Furthermore, the invention may be applied to a furnace having a burner at one end only of the tube, rather than a pair of regenerative burners which fire alternately into the same tube.

Whilst products of combustion from the radiant tube constitute a readily available mixture which will not contribute significantly to combustion in the radiant tube, other sources of gas may be used to provide a gaseous shield. Although a shield which will not participate substantially in combustion occurring within the radiant tube is preferred, the shield may be formed of or include air. The air may be relatively cool air or air which has received heat derived from products of combustion leaving the radiant tube.

If air is introduced so that the shield includes oxygen, the mixture flowing through the guide 25 may be correspondingly fuel-rich. This promotes a long flame and lower flame temperature.

We have found that gaseous shields help to avoid very high flame temperatures and therefore contribute to low concentrations of oxides of nitrogen in the gases discharged.

What we claim is:

1. A method of burning a fuel to supply heat comprising the steps of: directing a burning mixture of the fuel with air through a tube to heat the tube and cause the tube to radiate heat for an indefinite number of cycles, directing the burning mixture of fuel and air into the tube at a first end thereof generating products of combustion, discharging said products of combustion from a second end of the tube and storing heat from said products of combustion during a first part of each cycle; directing a burning mixture of fuel and air into the tube at the second end thereof generating further products of combustion, heating the air with heat stored from said first part of each cycle, discharging said further products of combustion from the tube at the first end thereof, and storing heat from said further products of combustion during a second part of each cycle; and admitting a further gas to the interior of the tube adjacent to the wall thereof to form a shield between the burning mixture and a part of the tube wall.

2. A method according to claim 1 wherein substantially all products of combustion are discharged through a heat storage means.

3. A method of burning a fuel to supply heat comprising the steps of: directing a burning mixture of the fuel with air generating products of combustion through a tube having an interior wall to heat the tube and cause the tube to radiate heat, for an indefinite number of cycles, each cycle having a first part during which the burning mixture of fuel and air enters the tube at a first end thereof, a first portion of said products of combustion leave a second end of the tube, cooling said products of combustion by heat storage means, a second portion of said products of combustion leaving the second end of the tube flowing to the first end of the tube without passing to the heat storage means, and each cycle having a second part during which the burning mixture of fuel and air enters the tube at the second end thereof, heating the air by the heat storage means, cooling a first portion of said products of combustion leaving the tube at the first end thereof by the heat storage means, a second portion of the products of combustion leaving the tube at the first end thereof flowing to the second end of the tube without passing to the heat storage means, whereby products of combustion are circulated through the tube, wherein said second portion is admitted to the interior of the tube adjacent to the wall thereof and wherein said second portion forms a shield between the burning mixture and a part of the tube wall.

4. A method of burning a fuel to supply heat to contents of a chamber, comprising the steps of:

directing a burning mixture of the fuel with air through a tube having an interior wall which extends through the chamber to heat the tube and cause the tube to radiate heat to the contents of the chamber in an indefinite number of cycles, each cycle having a first part and a second part, said first part comprising the steps of directing the burning mixture of fuel and air into a first end of the tube in a first direction to generate first products of combustion within said tube, discharging said first products of combustion from a second end of said tube, and storing heat from said first products of combustion; said second part comprising the steps of heating air for the burning mixture of fuel and air with heat stored from said first part, directing the burning mixture of fuel and heated air into the second end of the tube in a second direction to generate further products of combustion within said tube, discharging said further products of combustion from said first end of the tube, and storing heat from said further products of combustion; and admitting a further gas to the tube adjacent to the interior wall thereof to flow along the tube in said first direction to form a shield between the burning mixture and a part of the tube wall adjacent to the first end of the tube in said first part of each cycle, and to form a shield between the burning mixture and a part of the tube wall adjacent to the second end of the tube during said second part of each cycle.

5. A radiant tube furnace for burning a fuel to supply heat, said furnace comprising: a radiant tube with an interior wall and first and second ends; means for directing a burning mixture of the fuel and air into the first end of the tube to generate first products of combustion within the tube; means for discharging said first products of combustion from the second end of the tube including means for storing heat from said first products of combustion; means for heating air for the burning mixture of fuel and air with heat from said means for storing heat; means for directing the burning mixture of fuel and heated air into the second end of the tube to generate further combustion products within said tube; means for discharging said further products of combustion from said first end of the tube, including means for storing heat from said further products of combustion; and means for admitting a further gas to form a shield between the burning mixture and a part of the tube wall adjacent to the first end of the tube and to form a shield between the burning mixture and a part of the tube wall adjacent to the second end of the tube.

* * * * *